(12) United States Patent
Ozaki et al.

(10) Patent No.: US 6,184,947 B1
(45) Date of Patent: Feb. 6, 2001

(54) THIN FILM TRANSISTOR MATRIX WITH REPAIRABLE BUS LINE

(75) Inventors: Kiyoshi Ozaki, Yonago; Makoto Igarashi, Kawasaki, both of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/348,084

(22) Filed: Jul. 6, 1999

(30) Foreign Application Priority Data

Dec. 25, 1998 (JP) .................................................. 10-371422

(51) Int. Cl.[7] .......................... G02F 1/136; G02F 1/1343
(52) U.S. Cl. ................................ 349/42; 349/43; 349/143
(58) Field of Search ............................... 349/42, 43, 143, 349/139, 140, 147, 46; 257/59, 72

(56) References Cited

U.S. PATENT DOCUMENTS

| | | | |
|---|---|---|---|
| 4,688,896 | * 8/1987 | Castleberry | 350/333 |
| 5,036,370 | 7/1991 | Miyago et al. | 357/4 |
| 5,068,699 | 11/1991 | Chang | 357/23.7 |
| 5,156,986 | 10/1992 | Wei et al. | 437/40 |
| 5,555,112 | * 9/1996 | Oritsuki et al. | 359/59 |
| 5,671,027 | 9/1997 | Sasano et al. | 349/46 |
| 5,728,592 | 3/1998 | Oki et al. | 437/21 |
| 5,771,083 | * 6/1998 | Fujihara et al. | 349/147 |
| 5,851,861 | 12/1998 | Suzawa et al. | 438/166 |
| 5,898,573 | * 3/1999 | Yamamoto et al. | 349/152 |
| 5,929,947 | * 7/1999 | Tani | 349/42 |
| 5,995,178 | * 11/1999 | Fujikawa et al. | 349/55 |
| 6,002,462 | * 12/1999 | Sato et al. | 349/106 |

FOREIGN PATENT DOCUMENTS

| | | |
|---|---|---|
| 63-44632 | 2/1988 | (JP) . |
| 3-136280 | * 6/1991 | (JP) . |

* cited by examiner

Primary Examiner—Kenneth Parker
Assistant Examiner—Mike Qi
(74) Attorney, Agent, or Firm—Greer, Burns & Crain, LTD (57) ABSTRACT

A thin film transistor matrix including: a plurality of thin film transistors disposed in a matrix shape on a transparent insulating substrate, each thin film transistor having a gate electrode, a source electrode and a drain electrode; a pixel electrode formed on the transparent insulating substrate and connected to the source electrode of each of the plurality of thin film transistors; a plurality of gate bus lines connected to the gate electrode, disposed as a whole along a row direction on the transparent insulating substrate, and including a first lamination of a first metal layer and an underlying first semiconductor layer; and a plurality of drain bus lines connected to the drain electrode, disposed as a whole along a column direction on the transparent insulating substrate, and including a second lamination of a second metal layer and an underlying second semiconductor layer.

21 Claims, 6 Drawing Sheets

THIN FILM TRANSISTOR MATRIX WITH REPAIRABLE BUS LINE

This application is based on Japanese patent application HEI 10-371422, filed on Dec. 25, 1998, the whole contents of which are incorporated herein by reference.

BACKGROUND OF THE INVENTION a) Field of the Invention

The present invention relates to a method of manufacturing a thin film transistor matrix, and more particularly to a thin film transistor matrix and its method of manufacture that enables repairing a disconnection or breaking of a metal bus line pattern.

b) Description of the Related Art

Liquid crystal panels of the thin film transistor (TFT) matrix type are being developed mainly for lap-top type personal computers and for wall hanging televisions. The TFT has two types of gates: a bottom gate type having a gate electrode disposed under an active semiconductor layer via a gate insulating film; and a top gate type having a gate electrode disposed over an active semiconductor layer via a gate insulating film.

A source electrode and a drain electrode are generally formed on the active semiconductor layer on both sides of a gate electrode, the source/drain electrode being a lamination of a metal layer and a contact semiconductor layer having a high impurity concentration. One of the source/drain electrodes is connected to a data bus line, and the other is connected to a pixel electrode.

In this specification, the source/drain connected to the data bus line is called a drain, and the source/drain connected to the pixel electrode is called a source. The data bus line is called a drain bus line.

A TFT matrix type liquid crystal display panel has a plurality of drain bus lines and data bus lines crossing each other and formed on a transparent insulating substrate. The drain bus line is connected to the drain of a TFT, and the gate bus line is connected to the gate thereof. Generally, the drain bus line and the drain electrode are made of the same conductive layer. The gate bus line and the gate electrode are also made of the same conductive layer.

In this specification, when a single bus line constitutes a plurality of gate bus line portions and a plurality of gate electrode portions, the gate bus line portions are collectively called a single gate bus line.

A glass substrate used for a liquid crystal panel has a large area so that it is difficult to perfectly prevent foreign particles from dropping on the substrate during the manufacturing processes. If foreign particles exist on the glass substrate surface during the conductive layer formation, the conductive layer is not deposited directly on the glass substrate, but is instead deposited on the foreign particles. After the foreign particles are removed by cleaning or the like, pin holes are formed in the conductive layer.

If such pin holes completely or nearly break a gate bus line or drain bus line, the liquid crystal panel has a line defect. If pin holes exist in a source/drain electrode, a pixel electrode or a gate electrode branched from a gate bus line, there is a high possibility of pixel defects. Such defects, particularly line defects, are likely to become fatal defects in the liquid crystal display panel.

As described above, it is difficult to perfectly prevent a mixture of foreign particles during manufacture processes of a liquid crystal display panel. Line defects are likely to become fatal defects in the liquid crystal display panel. It has been desired therefore to provide the structure and manufacture method of a liquid crystal display panel capable of repairing a defective bus line even if foreign particles drop on the substrate during the manufacturing processes of the liquid crystal display panel.

SUMMARY OF THE INVENTION

It is an object of the present invention to provide a thin film transistor matrix capable of repairing a defective bus line.

It is another object of the present invention to provide a thin film transistor matrix manufacture method capable of repairing a defective bus line if there is any defective bus line.

According to one aspect of the present invention, there is provided a thin film transistor matrix comprising: an insulating substrate; a plurality of thin film transistors disposed in a matrix shape on the insulating substrate, each thin film transistor having a gate electrode, a source electrode and a drain electrode; a pixel electrode formed on the insulating substrate and connected to the source electrode of each of the plurality of thin film transistors; a plurality of gate bus lines disposed as a whole along a row direction on the insulating substrate, each gate bus line being connected to the gate electrode and including a first lamination of a first metal layer and an underlying first semiconductor layer; and a plurality of drain bus lines disposed as a whole along a column direction on the insulating substrate, each drain bus line being connected to the drain electrode and including a second lamination of a second metal layer and an underlying second semiconductor layer.

According to another aspect of the invention, there is provided a method of manufacturing a thin film transistor matrix having a plurality of thin film transistors disposed in a matrix form on an insulating substrate and each having a gate electrode, a source electrode and a drain electrode, a pixel electrode connected to the source electrode of each of the plurality of thin film transistors, a plurality of gate bus lines disposed as a whole along a row direction, and a plurality of drain bus lines disposed as a whole along a column direction, the method comprising the steps of: forming a first semiconductor layer on the insulating substrate; forming a first metal layer on the first semiconductor layer; and patterning the first metal layer and the first semiconductor layer to form the gate electrode and the gate bus line of the thin film transistor.

Since the semiconductor layer exists under the metal layer, even if pin holes are formed in the metal layer, the semiconductor layer is still resident under the pin holes.

The metal layer can be formed selectively on the semiconductor layer. Even if there is any breakage and disconnection in a patterned metal layer, the breakage can be repaired.

By repairing a defective bus line, the yield of the manufacturing processes for a thin film matrix can be improved. It is possible to prevent the occurrence of line defects which an likely to become fatal defects in the liquid crystal display device.

DETAILED DESCRIPTION OF THE PREFERRED EMBODIMENTS

Embodiments of the invention will be described with reference to the accompanying drawings.

Figure 1A:
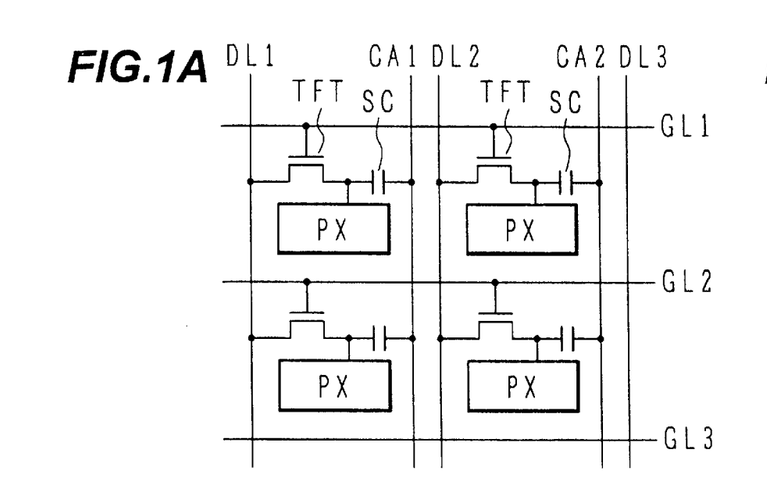
FIGS. 1A to 1D are equivalent circuit diagrams of thin film transistor matrices and cross sectional views showing cross areas of bus lines, according to embodiments of the present invention.
Figure 1B:
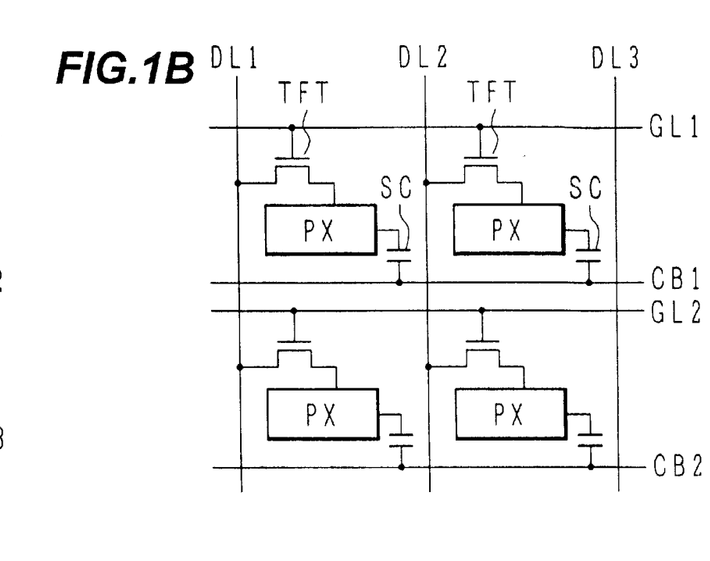
Figure 1C:
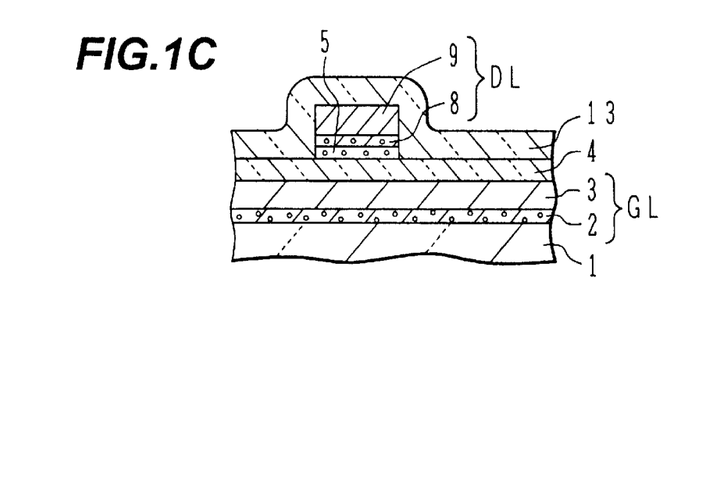
Figure 1D:
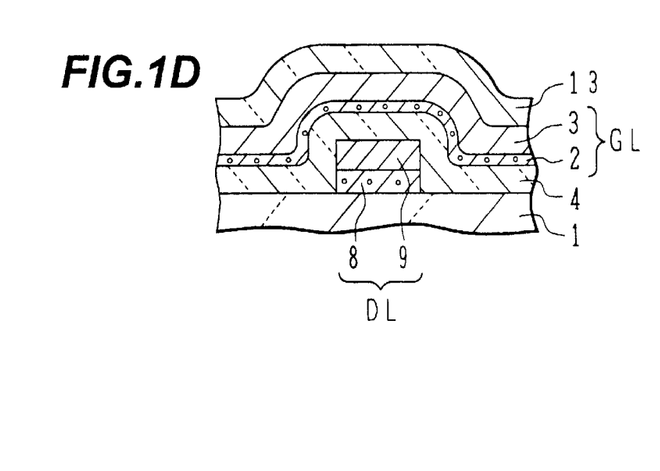

FIGS. 1A and 1B are equivalent circuit diagrams showing the outline structures of thin film transistor matrices, and FIGS. 1C and 1D are cross sectional views showing cross areas of a gate bus line a and drain bus line, according to embodiments of the present invention.

As shown in FIG. 1A, a thin film transistor matrix has a plurality of gate bus lines GL1, GL2, GL3, . . . and a plurality of drain bus lines DL1, DL2, DL3, . . . crossing each other and formed typically on a transparent substrate. At each cross point of the gate bus line GL the and drain bus line DL, a thin film transistor TFT is disposed. The gate electrode of the TFT is connected to the gate bus line GL, and the drain electrode thereof is connected to the drain bus line DL. The source electrode of the TFT is connected to a pixel electrode PX and to one electrode of a storage capacitor SC formed by the pixel electrode PX. The other electrode of the storage capacitor SC is connected to a corresponding one of the storage capacitor bus lines CA1, CA2, . . . disposed in parallel to the drain bus lines DL.

The storage capacitor bus line CA is used for connecting the other electrodes of the storage capacitor SC to a power source having a predetermined voltage, and is preferably disposed in parallel to either the drain bus line DL or the gate bus line GL.

FIG. 1B shows the structure wherein the storage capacitor bus lines CB1, CB2, . . . are disposed the gate bus lines GL1, GL2, . . . The other structure is the same as that shown in FIG. 1A.

In any of the above-described structures, the gate bus line GL and the gate electrode of the TFT are made of the same conductive layer. The drain bus line DL and the drain electrode of the TFT are also made of the same conductive layer. A cross area between the drain bus line DL and gate bus line GL is insulated by a gate insulating film.

FIG. 1C shows the structure of a cross area between the drain bus line DL and the gate bus line GL of a bottom gate type thin film transistor. For the bottom gate type thin film transistor, gate electrodes and gate bus lines GL are first formed on a transparent insulating substrate 1 made of a glass substrate.

In this embodiment, the gate electrode and gate bus line GL are made of a semiconductor layer 2 having a high impurity concentration and a metal bus line layer 3. A gate insulating film 4 is formed covering the gate bus line GL. An active semiconductor layer 5 for forming a channel is formed on the gate insulating film 4, and on this layer 5 a contact semiconductor layer 8 having a high impurity concentration and a metal bus line layer 9 are formed. These layers 5, 8 and 9 are patterned into shapes of the source/drain electrode and drain bus line.

In the channel region of the TFT, an insulating film as an etching stopper is formed on the active semiconductor layer 5, and the contact semiconductor layer 8 and metal bus line layer 9 are removed while leaving the active semiconductor layer 5 forming the channel.

The semiconductor layer 2 in the gate bus line GL is an unnecessary constituent as the gate bus line. However, by forming this semiconductor layer 2 under the metal bus line layer 3, it becomes possible to repair a defect such as disconnection of the metal bus line layer of the gate bus line. The active semiconductor layer 5 under the drain bus line DL is left from the reason of manufacture processes to be described later. The active semiconductor layer 5 as the bus line layer may be removed by changing manufacturing processes.

FIG. 1D shows the structure of a cross area of bus lines of a top gate type thin film transistor. On a transparent insulating substrate 1, a contact semiconductor layer 8 and a metal bus line layer 9 are laminated and patterned into bus line shapes. The lamination of the contact semiconductor layer 8 and the metal bus line layer 9 provides the function of the drain bus line DL. A gate insulating film 4 is formed covering the metal bus line layer 9. In the area of a thin film transistor, an active semiconductor layer such as the active semiconductor layer 5 shown in FIG. 1C is disposed under the contact semiconductor layer 8. An insulating layer serving as an etching stopper is disposed on the active semiconductor layer forming the channel, and the metal bus line layer 9 and the contact semiconductor layer 8 over the insulating film are removed. Therefore, the active semiconductor layer faces via the gate insulating film a gate electrode to be formed on the gate insulating film.

In the cross area, a semiconductor layer 2 having a high impurity concentration and a metal bus line layer 3 are formed over the gate insulating film 4, these layers 2 and 3 constituting a gate bus line GL. The gate bus line GL is covered with an insulating protection film 13.

Similar to the case shown in FIG. 1C, the semiconductor layer 2 of the gate bus line GL is an unnecessary constituent as the gate bus line. However, by disposing the semiconductor layers 2 and 8 under the metal bus line layers 3 and 9, a defect such as a disconnection formed in the metal bus line layers 3 and 9 can be repaired by using the semiconductor layers 2 and 8. This will be described by taking as an example the bottom gate type thin film transistor shown in FIG. 1C.

FIGS. 2A to 2F are cross sectional views illustrating manufacturing processes for a thin film transistor matrix and a liquid crystal display panel using the thin film transistor matrix.

Figures 2A, 2B, 2C, 2E, 2F:
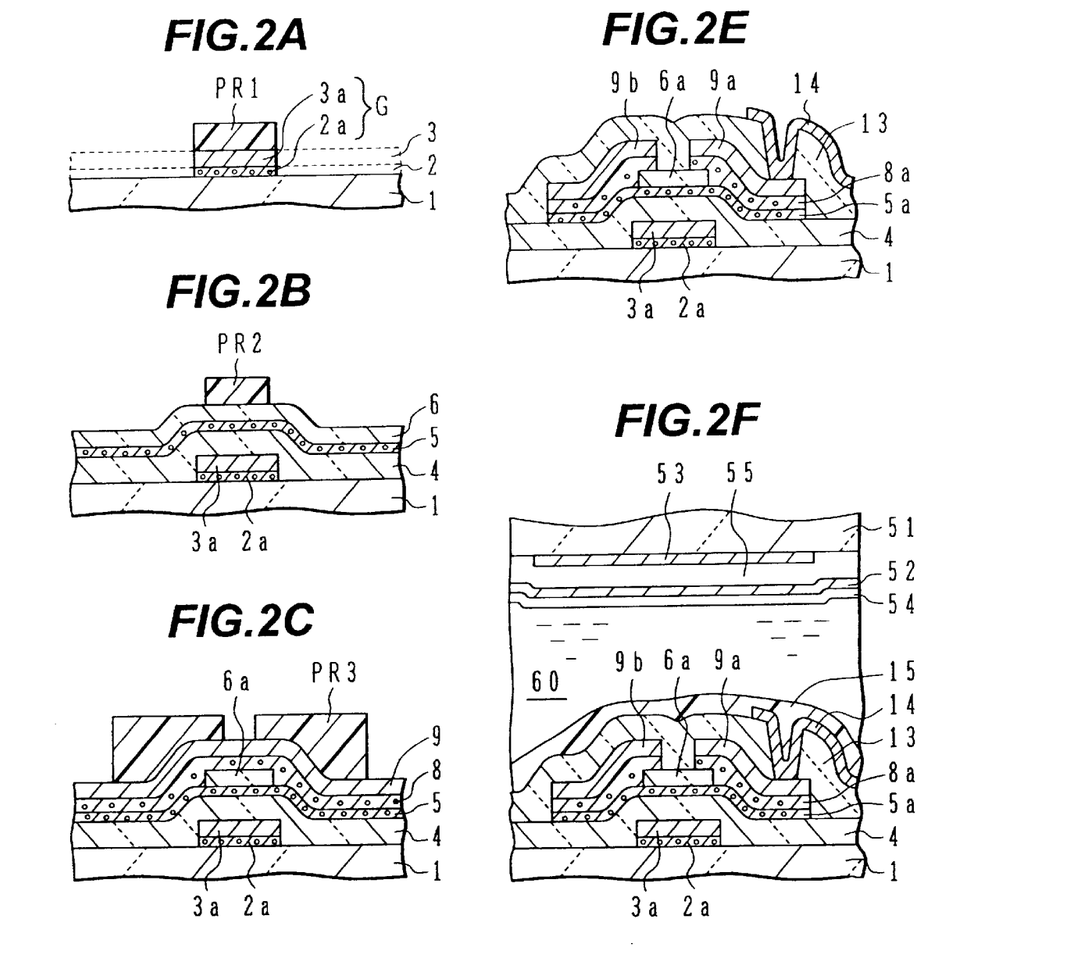
FIGS. 2A to 2F are cross sectional views illustrating main manufacture processes for a liquid crystal display panel using a bottom gate type TFT substrate.

As shown in FIG. 2A, on the surface of a transparent insulating substrate 1 made of a glass substrate, an $n_+$ type silicon layer 2 heavily doped with n-type impurities is formed, for example, to a thickness of about 50 nm by plasma enhanced chemical vapor deposition (PE-CVD). The silicon layer 2 may be either amorphous or polycrystalline. In the following description, an amorphous silicon layer is used by way of example.

If a polycrystalline silicon layer is used, an amorphous silicon layer is formed and then it is changed to a polycrystalline silicon layer by laser annealing.

The silicon layer 2 is used for selectively growing a metal layer thereon. If this selective growth function is guaranteed, the thickness of the silicon layer 2 may be set as desired. On the surface of the silicon layer 2, a gate metal layer 3 made of, for example, a Cr layer having a thickness of about 150 nm, is deposited by sputtering. Instead of Cr, the material of the gate metal layer 3 may be W, Ti, Mo, Ta, or alloy thereof.

It is difficult to successively form the semiconductor layer 2 and the gate metal layer (metal bus line layer) 3 in a same manufacturing system. Therefore, different manufacturing systems are used for these two steps with a cleaning process being interposed.

A photoresist layer is coated on the gate metal layer 3, exposed and developed to form a resist pattern PR1. The resist pattern PR1 has a shape defining the gate electrode, gate bus line, and storage capacitor bus line. By using the resist pattern PR1 as a mask, the gate metal layer 3 and semiconductor layer 2 are etched to thereby leave a patterned semiconductor layer 2a and a patterned gate metal layer 3a. After this etching, the resist pattern PR1 is removed. After the resist pattern PR1 is removed, the surface of the patterned bus line layer is cleaned.

As shown in FIG. 2B, a gate insulating film 4, an active semiconductor layer 5 and a channel protection film 6 are formed by PE-CVD, covering the patterned gate metal layer 3a and semiconductor layer 2a. For example, the gate insulating film 4 is made of an SiN layer having a thickness of about 400 nm, the active semiconductor layer 5 is made of an amorphous silicon (a-Si) layer having a thickness of about 15 nm, and the channel protection film 6 is made of an SiN layer having a thickness of about 120 nm.

A resist film is coated on the channel protection film 6, exposed and developed to form a resist pattern PR2. The resist pattern PR2 is disposed over an area where a channel of a thin film transistor is formed. By using the resist pattern PR2 as a mask, the channel protection film 6 is dry-etched.

For example, this dry etching is performed by flowing $O_2$ gas (flow rate of 170 to 230 sccm, e.g., 200 sccm) and $SF_6$ gas (flow rate of 175 to 225 sccm, e.g., 200 sccm) under the conditions of a pressure in an etching system of about 8 Pa and a high frequency power of 600 W. With this dry etching, a channel protection film 6a (shown in FIG. 2C) is left only over the channel region. After the dry etching, the resist pattern PR2 is removed and the surface of the substrate is cleaned.

As shown in FIG. 2C, on the surfaces of the patterned channel protection film 6 and the active semiconductor layer 5 a contact semiconductor layer 8 made of an $n_+$-type a-Si layer having a thickness of about 30 nm is formed by PE-CVD. After the surface of the layer 8 is cleaned, a source/drain metal layer 9 is formed on the contact semiconductor layer 8 by sputtering (physical vapor deposition PVD). For example, the source/drain metal layer is made of a single metal layer having a thickness of 150 nm. The material of the source/drain metal layer may be W, Cr, Ta, Mo, Ti or the like.

Instead of the single metal layer, a Ti/Al/Ti lamination may be formed through sputtering by first forming a Ti layer to a thickness of about 20 nm for example, then forming an Al layer to a thickness of about 50 nm for example, and lastly forming a Ti layer to a thickness of about 80 nm for example. An Al layer having a high electric conductivity is preferably used as the main bus line layer of the source/drain metal lamination layer. The Ti layer under the Al layer improves the characteristics of contact to the semiconductor layer, and the Ti layer over the Al layer improves the characteristics of contact to an indium-tin oxide (ITO) layer serving as a transparent electrode.

A photoresist layer is coated on the source/drain metal layer 9, and is exposed and developed to form a resist pattern PR3. The resist pattern PR3 has a shape to define the source/drain electrode area of a thin film transistor and the drain bus line. By using the resist pattern PR3 as a mask, the source/drain metal layer 9, contact semiconductor layer 8 and active semiconductor layer 5 are successively dry-etched. The channel protection film 6a functions as an etching stopper in an area over the channel so that the active semiconductor layer 5 is left under the channel protection film 6a. After the etching, the resist pattern PR3 is removed and the surface of the substrate is cleaned.

Figure 2D:
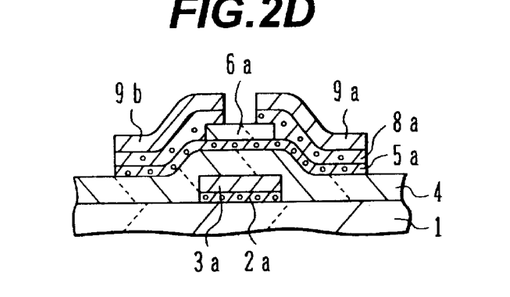

FIG. 2D shows the cross sectional structure of the thin film transistor formed by the above processes. The transparent insulating substrate has a gate electrode G (2a, 3a) formed thereon, and the patterned active semiconductor layer 5a is left on the gate insulating film 4. The channel protection film 6a is disposed on a central area of the active semiconductor layer 5a, and patterned contact semiconductor layer 8a, source metal layer 9a and drain metal layer 9b are left on both sides and on edge portions of the channel protection film 6a.

Figure 3:
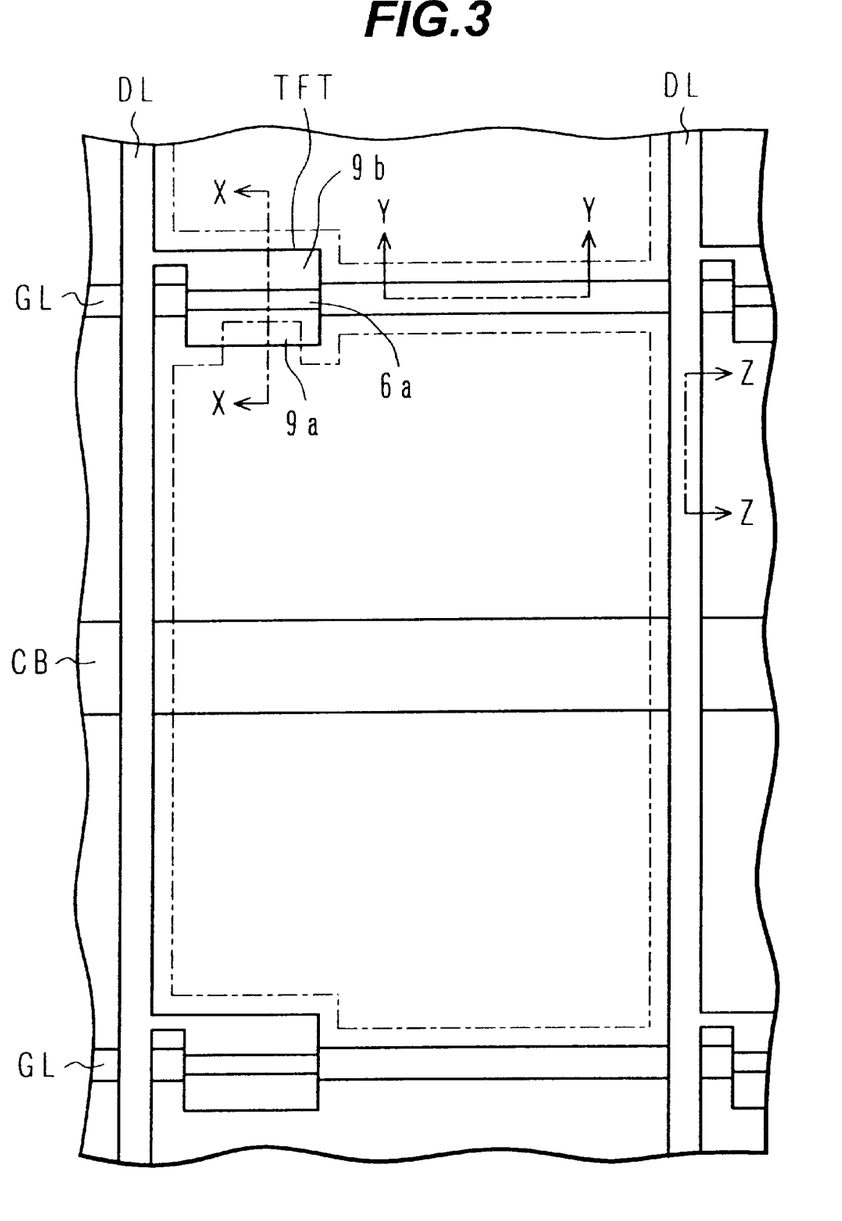
FIG. 3 is a schematic plan view of the TFT substrate after the process shown in FIG. 2D.

FIG. 3 is a schematic plan view showing the layout of a thin film transistor matrix in the state shown in FIG. 2D. Gate bus lines GL and storage capacitor bus lines CB are disposed in the horizontal direction in FIG. 3, and drain bus lines DL extending in the vertical direction in FIG. 3 are formed over the gate bus lines GL and storage capacitor bus lines CB via the gate insulating film. A thin film transistor TFT is formed to be branched from the drain bus line DL. In the thin film transistor TFT, the channel protection film 6a is exposed in the central area thereof, and the source metal layer 9a and drain metal layer 9b are left on both sides of the central area. The cross sectional views of FIGS. 2A to 2F are taken along line X—X in FIG. 3.

As shown in FIG. 2E, an insulating protection film 13 made of, for example, an SiN film having a thickness of about 300 nm, is formed by PE-CVD on the surface of the substrate already formed with thin film transistors, gate bus lines GL, drain bus lines DL and storage capacitor bus lines CB. An opening exposing the contact area of the source metal layer 9a is formed through the insulating protection film 13. A pixel electrode layer made of, for example, an ITO layer having a thickness of about 70 nm, is formed on the insulating protection film 13 is and patterned through photolithography and etching to form a pixel electrode 14.

As shown in FIG. 2F, an orientation film 15 is formed covering the pixel electrode 14 and insulating protection film 13, and an orientation process such as rubbing is performed. In this manner, a thin film transistor matrix is formed.

An opposing substrate is formed in the following manner. On the surface of a transparent insulating substrate 51 such as a glass substrate, a black matrix 53 such as a Cr layer is formed and patterned. The black matrix functions as a light shielding film and covers the surface area except for display area. After a color filter 55 is formed, a common electrode made of an ITO layer is formed over the whole surface. An orientation film 54 is formed to cover the common electrode 52, and the surface of the orientation film 54 is subjected to an orientation process such as rubbing. The color filter may be formed on the substrate of the thin film transistor matrix.

By facing the TFT substrate and opposing substrate as shown in FIG. 2F, the peripheral side is adhered with a sealing agent to form a space between the substrates in which liquid crystal is accommodated. Liquid crystal is introduced from an inlet port formed through a sealed wall to form a liquid crystal layer 60 and complete the liquid crystal display panel.

If foreign particles happen to be attached to the surface of an underlying layer of the metal layer, the metal layer to be formed thereafter is deposited on the foreign particles. After the film forming and patterning, the substrate is cleaned, at which time the foreign particles are removed and pin holes are formed. If pin holes traverse a bus line, the bus line will be cut. After a thin film transistor matrix is formed, the characteristics such as a resistance value (disconnection) and a short circuit are checked with a TFT tester. For example, if a portion of the metal layer is broken, an abnormal resistance value is measured during the test so that a bus line disconnection can be detected.

Referring to FIG. 3, a disconnection of the gate bus line GL and a disconnection of the drain bus line DL caused by foreign particles mixed in the bus lines will be described by way of example, with reference to the cross sectional views of FIGS. 4A to 4D taken along line Y—Y and line Z—Z shown in FIG. 3.

FIGS. 4A to 4D are cross sectional views of a gate bus line taken along line Y—Y and a drain bus line taken along line Z—Z.

Figure 4A:
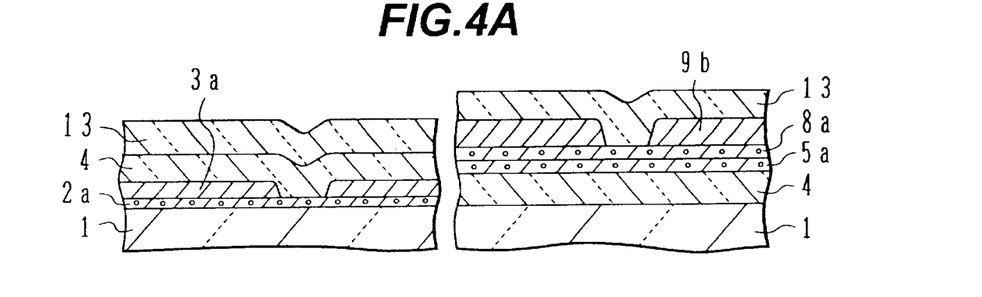
FIGS. 4A to 4D are schematic cross sectional views illustrating the processes of repairing a defect in a metal layer.

FIG. 4A shows a disconnection of the metal layer 3a of the gate bus line and a disconnection of the metal layer 9b of the drain bus line, both caused by foreign particles dropped on the bus lines. The metal layer 3a is covered with the gate insulating film and insulating protection film 13. The metal layer 9b of the drain bus line is covered with the insulating protection film 13.

In these bus lines, the semiconductor layers 2a and 8a having a high impurity concentration are formed under the metal layers 3a and 9b. If the metal layer is cut, the electrical resistance of the bus line increases greatly. It is therefore easy to electrically detect a disconnection of a bus line. A TFT tester can identify the address of each bus line. An optical camera mounted on the TFT tester can optically observe the substrate surface so that the place where a defect, such as disconnection, exists can be located. After a defect is located, the defect is repaired.

Figure 4B:
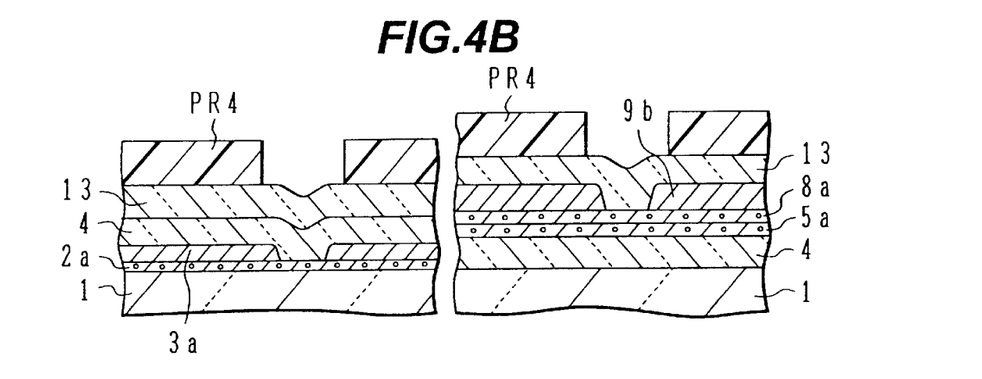

As shown in FIG. 4B, a resist layer is coated on the substrate surface, exposed and developed to form a resist pattern PR4 having an opening at the area corresponding to each defective area. By using the resist pattern PR4 as a mask, the insulating protection film 13 and gate insulating film 4 exposed in the opening are etched.

For example, this etching is performed in a dry etching system for about 2 minutes by flowing a mixture of $O_2$ gas at a flow rate of 200 sccm and $SF_6$ gas at a flow rate of about 200 sccm under the conditions of a reaction chamber pressure of about 8 Pa and a high frequency power of about 600 W.

Figure 4C:
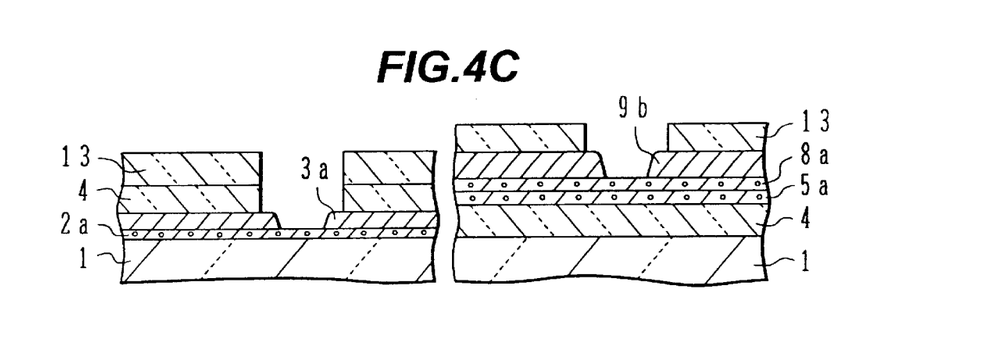

FIG. 4C shows the state that the resist pattern PR4 was removed and the substrate was cleaned after the dry etching. In the defective area, the gate insulating film 4 and overlying insulating protection film 13 are removed and the metal layers 3a and 9b having defects are exposed.

A TFT substrate having an exposed defect is transported into a tungsten selective CVD system.

Figure 4D:
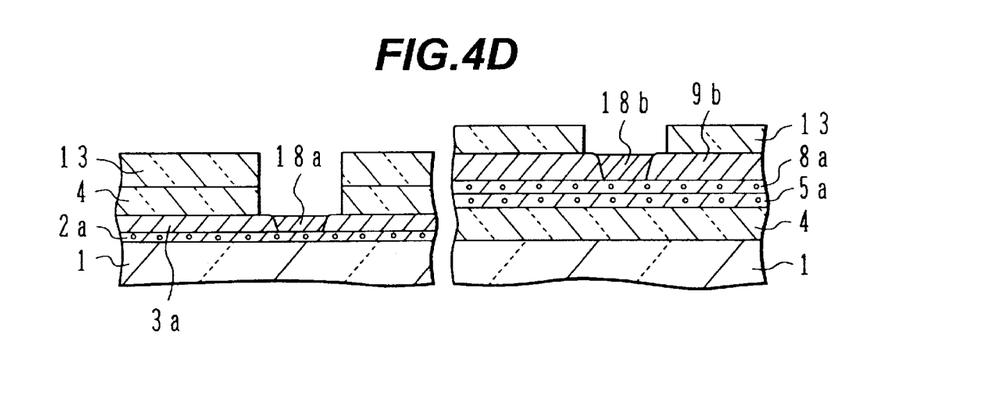

As shown in FIG. 4D, W is selectively grown on the silicon layer surface with the exposed defect. For example, this W CVD growth conditions are a substrate temperature of 200° C., a $WF_6$ gas flow rate of 5 sccm, an $SiH_4$ gas flow rate of 2 sccm, an $H_2$ gas flow rate of 80 sccm, and a CVD system pressure of 0.02 Torr.

Under these conditions, W is selectively grown only on the silicon layer surface, and is difficult to be grown on the surfaces of the insulating layer and metal layer. In this manner, the broken area of the gate bus line is embedded with a W layer 18a, and the broken area of the drain bus line is embedded with a W layer 18b. The broken gate and drain bus lines can therefore be repaired.

In the above description, although the defects of the drain and gate bus lines are detected and repaired after the structure of the TFT substrate is completed, the defects may be repaired at the intermediate stage of the manufacturing processes.

FIGS. 5A to 5D illustrate the processes of detecting and repairing a defect after the gate bus line (inclusive of the gate electrode and storage capacitor electrode) is formed. The cross sectional views of FIGS. 5A to 5D are taken along line Y—Y shown in FIG. 3.

Figure 5A:
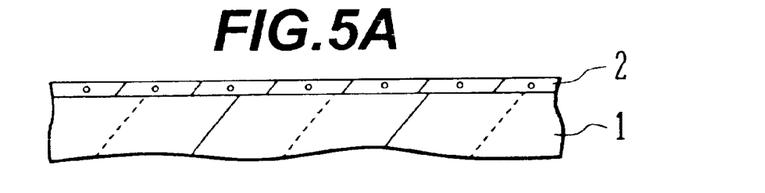
FIGS. 5A to 5D are schematic cross sectional views illustrating the processes of repairing a defect in a metal layer.

As shown in FIG. 5A, an $n_+$-type a-Si layer 2 is formed on a glass substrate 1, and thereafter the substrate surface is cleaned. During a process of transporting the substrate into a sputtering system after the cleaning process, foreign particles may by attached to the substrate surface.

Figure 5B:
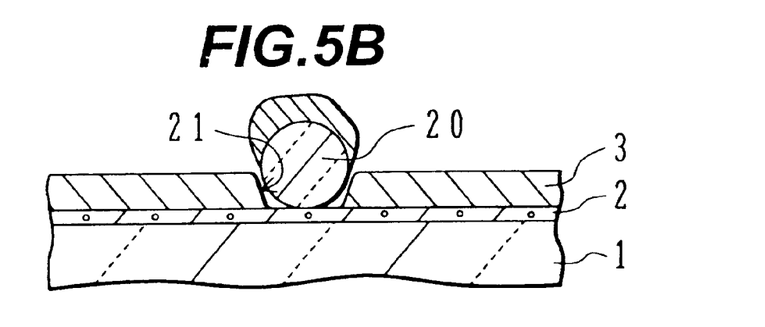

FIG. 5B shows a gate metal layer 3 formed on the surface of the $n_+$-type a-Si layer 2 with a foreign particle 20 being attached to this layer 2. In an area where the foreign particle 20 exists, the gate metal layer 3 is deposited on the foreign particle 20 and is not deposited on the surface of the $n_+$-type a-Si layer 2.

Therefore, a pin hole is formed in the gate metal layer 3.

Figure 5C:
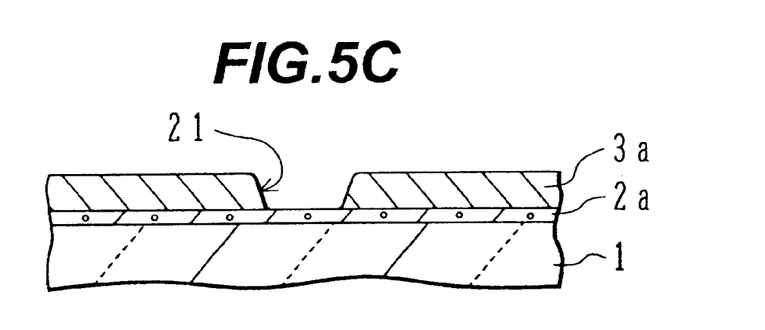
Figure 5D:
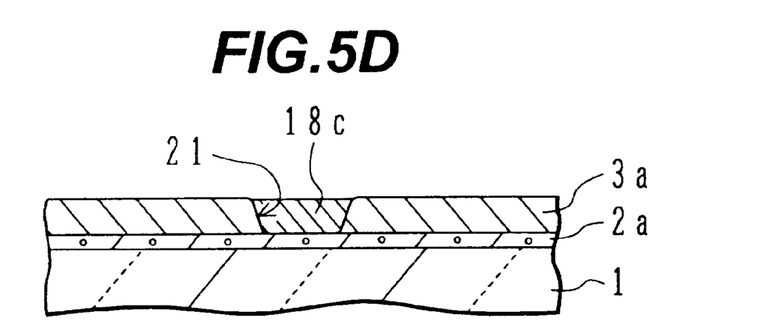

As shown in FIG. 3C, as the substrate is cleaned after the gate metal layer 3 is formed, the foreign particle 20 is removed and the pin hole 21 appears in the gate metal layer 3. At this stage, the gate metal layer is patterned. If the pin hole 21 traverses the gate bus line 3a, the patterned gate metal bus line 3a is cut. When a disconnection of the gate metal bus line is detected, the TFT substrate is transported into the W selective CVD system to selectively grow W. This W selective growth may be performed under the conditions described above.

Since the underlying semiconductor layer 2a is exposed in the pin hole 21, W is selectively grown on the pin hole 21 so that the pin hole 21 is embedded with a W layer 18c.

During the W selective growth, W is grown also on the side wall of the patterned semiconductor layer 2a. However, a thickness of grown W is sufficient if it has approximately the thickness (e.g., about 150 nm) of the metal layer on the semiconductor layer. Therefore, the influence upon a size precision of the bus line layer having a width of several $\mu$m is negligible.

Next, a method of repairing a defect in the source/drain electrode and drain bus line will be described with reference to FIGS. 6A and 6B which are cross sectional views taken along line X—X and line Z—Z shown in FIG. 3.

Figure 6A:
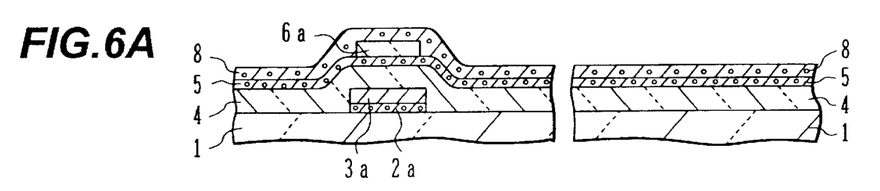
FIGS. 6A to 6E are schematic cross sectional views illustrating the processes of repairing a defect in a metal layer.

FIG. 6A is a cross sectional view of a substrate with the contact semiconductor layer 8 which is formed after the channel protection film 6a is formed on the active semiconductor layer 5, as shown in FIG. 2B.

Figure 6B:
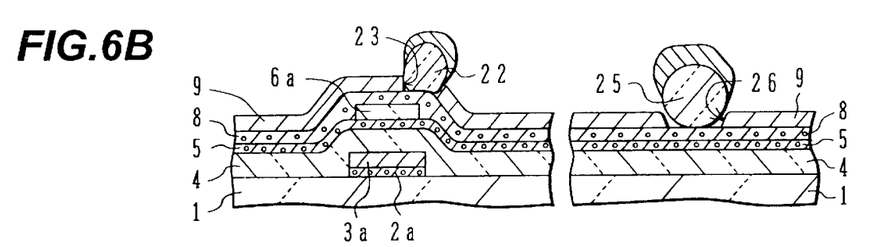

As shown in FIG. 6B, after the contact semiconductor layer 8 is formed, the substrate surface is cleaned and the substrate is transported into a sputtering system to form the source/drain metal layer 9. It is assumed that foreign particles 22 and 25 are attached to the surface of the contact semiconductor layer 8 during the process of transporting the substrate into the sputtering system after the cleaning process.

As the source/drain metal layer 9 is formed, it is deposited on the foreign particles 22 and 25 and is not deposited on the surface of the contact semiconductor layer 8 in the areas where the foreign particles exist. Pin holes 23 and 26 are therefore formed in the source/drain metal layer 9. As the substrate surface is cleaned after the source/drain metal layer 9 is formed, the foreign particles 22 and 25 are removed and the pin holes are exposed.

Figure 6C:
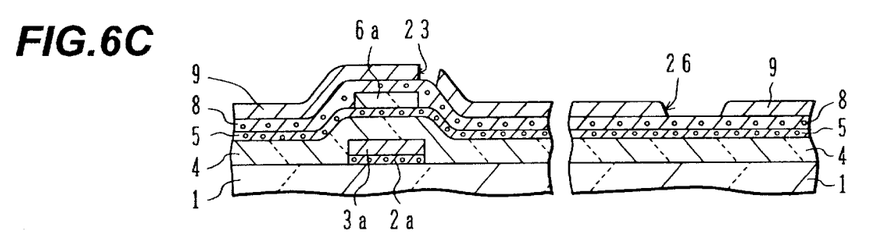

FIG. 6C shows the exposed pin holes 23 and 26 after the substrate surface is cleaned. A photoresist layer is coated on the substrate surface, and is exposed and developed to form a photoresist pattern. By using this photoresist pattern as a mask, the source/drain metal layer 9, contact semiconductor layer 8 and active semiconductor layer 5 are etched.

Figure 6D:
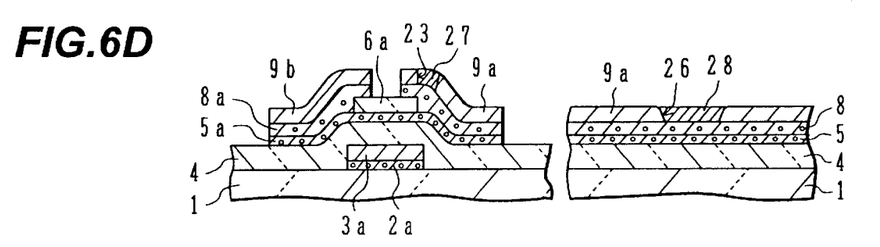

As shown in FIG. 6D, after the etching, removing the resist pattern, and cleaning the substrate surface, a source metal layer 9a, a contact semiconductor layer 8a, an active semiconductor layer 5a all patterned appear in the TFT area. The source metal layer 9a has a pin hole 23, and the drain bus line has a pin hole 26. A bus line layer is inspected at this stage, and it is assumed that a disconnection of the drain bus line is detected.

Then, the TFT substrate is transported into a W selective CVD system to selectively grow W. Since W is selectively grown on the exposed semiconductor layer surface, the pin holes 23 and 26 are embedded with W layers 27 and 28.

Figure 6E:
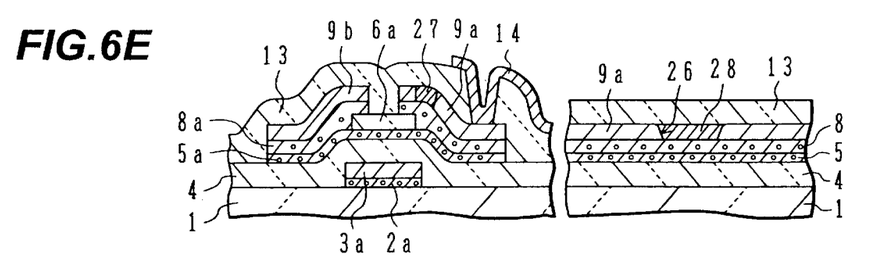

As shown in FIG. 6E, after the defects are repaired, the TFT substrate surface is covered with an insulating protection layer 13. A pixel electrode contact hole is formed through this layer 13, and an ITO film is formed and patterned through photolithography and etching to form an ITO electrode 14. Thereafter, an orientation film is formed on the surface of the TFT substrate and is subjected to an orientation process to complete the TFT substrate.

In the above description, although a bottom gate type TFT substrate is used, a top gate type TFT substrate can be repaired in the similar manner, as will be obvious to those skilled in the art of this field.

A defect of a bus line layer is repaired by W selective growth in the foregoing description. In addition to W, metals capable of being selectively grown may be Mo, Ta, Ti, Cr, Ni, Cu and Al. It is possible to repair a defect of a metal layer by using these metals in place of W. In case of reflection type LCD, the substrate may not be transparent, and an insulating substrate may be used.

The present invention has been described in connection with the preferred embodiments. The invention is not limited only to the above embodiments. It will be apparent to those skilled in the art, that various modifications, improvements, combinations, and the like can be made.

What claimed is:

1. A thin film transistor matrix comprising:
   an insulating substrate;
   a plurality of thin film transistors disposed in a row and column matrix pattern on said insulating substrate, each thin film transistor having a gate electrode, a source electrode and a drain electrode;
   a pixel electrode formed on said insulating substrate and connected to the source electrode of each of said plurality of thin film transistors;
   a plurality of gate bus lines disposed along a row direction on said insulating substrate, each gate bus line being connected to the gate electrode and including a first lamination of a first metal layer and a first semiconductor layer disposed directly under the first metal layer along substantially the entire length of the gate bus line; and
   a plurality of drain bus lines disposed along a column direction on said insulating substrate, each drain bus line being connected to the drain electrode and including a second lamination of a second metal layer and a second semiconductor layer disposed directly under the second metal layer along substantially the entire length of the drain bus line.

2. A thin film transistor matrix according to claim 1, wherein said insulating substrate is a transparent insulating substrate.

3. A thin film transistor matrix according to claim 1, wherein the gate electrode includes the first lamination same as the gate bus line, and the source electrode and the drain electrode include the second lamination same as the drain bus line.

4. A thin film transistor matrix according to claim 3, wherein the first metal layer has a first local defect where the first metal layer does not exist or exists only partially and a third metal layer embedded within the first local defect.

5. A thin film transistor matrix according to claim 3, wherein the second metal layer has a second local defect where the second metal layer does not exist or exists only partially and a fourth metal layer embedded within the first local defect.

6. A thin film transistor matrix according to claim 4, wherein the first metal layer is made of one material selected from a group consisting of Cr, Ta, Mo, W, Ti, and alloys thereof.

7. A thin film transistor matrix according to claim 4, wherein the third metal layer is made of one material selected from a group consisting of W, Mo, Ta, Ti, Cr, Ni, Cu and Al.

8. A thin film transistor matrix according to claim 5, wherein the second metal layer is a single layer made of one material selected from a group consisting of Cr, Ta, Mo, W, Ti, and alloys thereof or a lamination layer including an Al layer.

9. A thin film transistor matrix according to claim 5, wherein the fourth metal layer is made of one material selected from a group consisting of W, Mo, Ta, Ti, Cr, Ni, Cu and Al.

10. A thin film transistor matrix according to claim 1, further comprising:
    a plurality of storage capacitor bus lines disposed under said pixel electrode in parallel to said gate bus lines and over said transparent insulating substrate, said storage capacitor bus line being made of the first lamination; and
    an insulating film covering said plurality of storage capacitor bus lines and disposed under said pixel electrode over said transparent insulating substrate.

11. A thin film transistor matrix according to claim 1, further comprising:
    a plurality of storage capacitor bus lines disposed under said pixel electrode in parallel to said drain bus lines and over said transparent insulating substrate, said storage capacitor bus line being made of the second lamination; and
    an insulating film covering said plurality of storage capacitor bus lines and disposed under said pixel electrode over said transparent insulating substrate.

12. A thin film transistor matrix according to claim 1, wherein said first and second semiconductor layers are made of silicon.

13. A method of manufacturing a thin film transistor matrix having a plurality of thin film transistors disposed in a matrix form on an insulating substrate and each having a gate electrode, a source electrode and a drain electrode, a pixel electrode connected to the source electrode of each of the plurality of thin film transistors, a plurality of gate bus lines disposed as a whole along a row direction, and a plurality of drain bus lines disposed as a whole along a column direction, the method comprising the steps of:

forming a first semiconductor layer on the insulating substrate;

forming a first metal layer on the first semiconductor layer; and patterning the first metal layer and the first semiconductor layer to form the gate electrode and the gate bus line of the thin film transistor, wherein the first semiconductor layer is disposed directly under the first metal layer along substantially the entire length of the gate bus line.

14. A method of manufacturing a thin film transistor matrix according to claim 13, wherein said insulating substrate is a transparent insulating substrate.

15. A method of manufacturing a thin film transistor matrix according to claim 13, wherein said first semiconductor layer is a silicon layer.

16. A method of manufacturing a thin film transistor matrix according to claim 13, further comprising the steps of:

forming a second semiconductor layer on the insulating substrate;

forming a second metal layer on the second semiconductor layer; and patterning the second metal layer and the second semiconductor layer to form the drain electrode and the drain bus line of the thin film transistor.

17. A method of manufacturing a thin film transistor matrix according to claim 13, wherein the patterned first metal layer has a first defect where the first metal layer does not exist or exists only partially, and the method further comprises a step of selectively forming a third metal layer on the first semiconductor layer patterned and exposed by the first defect.

18. A method of manufacturing a thin film transistor matrix according to claim 16, wherein the patterned second metal layer has a second defect where the second metal layer does not exist or exists only partially, and the method further comprises a step of selectively forming a fourth metal layer on the second semiconductor layer patterned and exposed by the second defect.

19. A method of manufacturing a thin film transistor matrix according to claim 16, wherein the patterned first and second metal layers have defects where the associated first or second metal layer does not exists or exists only partially, and the method further comprises the steps of:

forming first and second insulating films respectively on the patterned first and second metal layers;

removing the first and second insulating films in areas where the defects exist; and selectively growing a third metal layer on the first and second semiconductor layers exposed in the areas where the defects exist.

20. A method of manufacturing a thin film transistor matrix according to claim 16, wherein said second semiconductor layer is a silicon layer.

21. A method of manufacturing a thin film transistor matrix having a plurality of thin film transistors disposed in a row and column matrix pattern on an insulating substrate and each having a gate electrode, a source electrode and a drain electrode, a pixel electrode connected to the source electrode of each of the plurality of thin film transistors, a plurality of gate bus lines disposed along a row direction, and a plurality of drain bus lines disposed along a column direction, the method comprising the steps of:

forming a first metal layer on said insulating substrate;

patterning said first metal layer to form said gate electrodes and said gate bus lines;

forming a semiconductor layer on said insulating substrate;

forming a second metal layer on said semiconductor layer;

patterning a lamination of said second metal layer and said semiconductor layer to form said drain electrodes and said drain bus lines, the patterned second metal layer having a defect where the second metal layer does not exist or exists only partially; and selectively growing a third metal layer on the semiconductor layer exposed at said defect.

* * * * *